United States Patent [19]
Murto

[11] 3,916,837
[45] Nov. 4, 1975

[54] BAFFLE FOR TROUGH FEEDER

[75] Inventor: Robert A. Murto, Goshen, Ind.

[73] Assignee: Chore-Time Equipment, Inc., Milford, Ind.

[22] Filed: Mar. 18, 1974

[21] Appl. No.: 451,768

[52] U.S. Cl. .................. 119/18; 119/51.12; 119/63
[51] Int. Cl.² ......................................... A01K 31/00
[58] Field of Search .............. 119/18, 63, 51.12, 59, 119/53

[56] References Cited
UNITED STATES PATENTS

| | | | |
|---|---|---|---|
| 3,112,731 | 12/1963 | Lako et al. | 119/51.12 |
| 3,124,104 | 3/1964 | Carpenter | 119/51.12 |
| 3,523,519 | 8/1970 | Hostetler | 119/18 |
| 3,638,618 | 2/1972 | Strother | 119/51.12 |
| 3,646,912 | 3/1972 | Gardner | 119/51.12 |

*Primary Examiner*—J. N. Eskovitz
*Attorney, Agent, or Firm*—Olson, Trexler, Wolters, Bushnell & Fosse, Ltd.

[57] ABSTRACT

A trough feeder for poultry and the like is provided with a shield to prohibit poultry from reaching into the trough during feed depositing operations. The shield can comprise a swingable portion movable between a closed and an opened position. A shield drive includes cables connected to the shield and a drive screw follower. A time clock and a feed level sensor can be included in a drive motor energizing circuit to open and close the feeder top when pre-set times and feed levels are reached.

8 Claims, 6 Drawing Figures

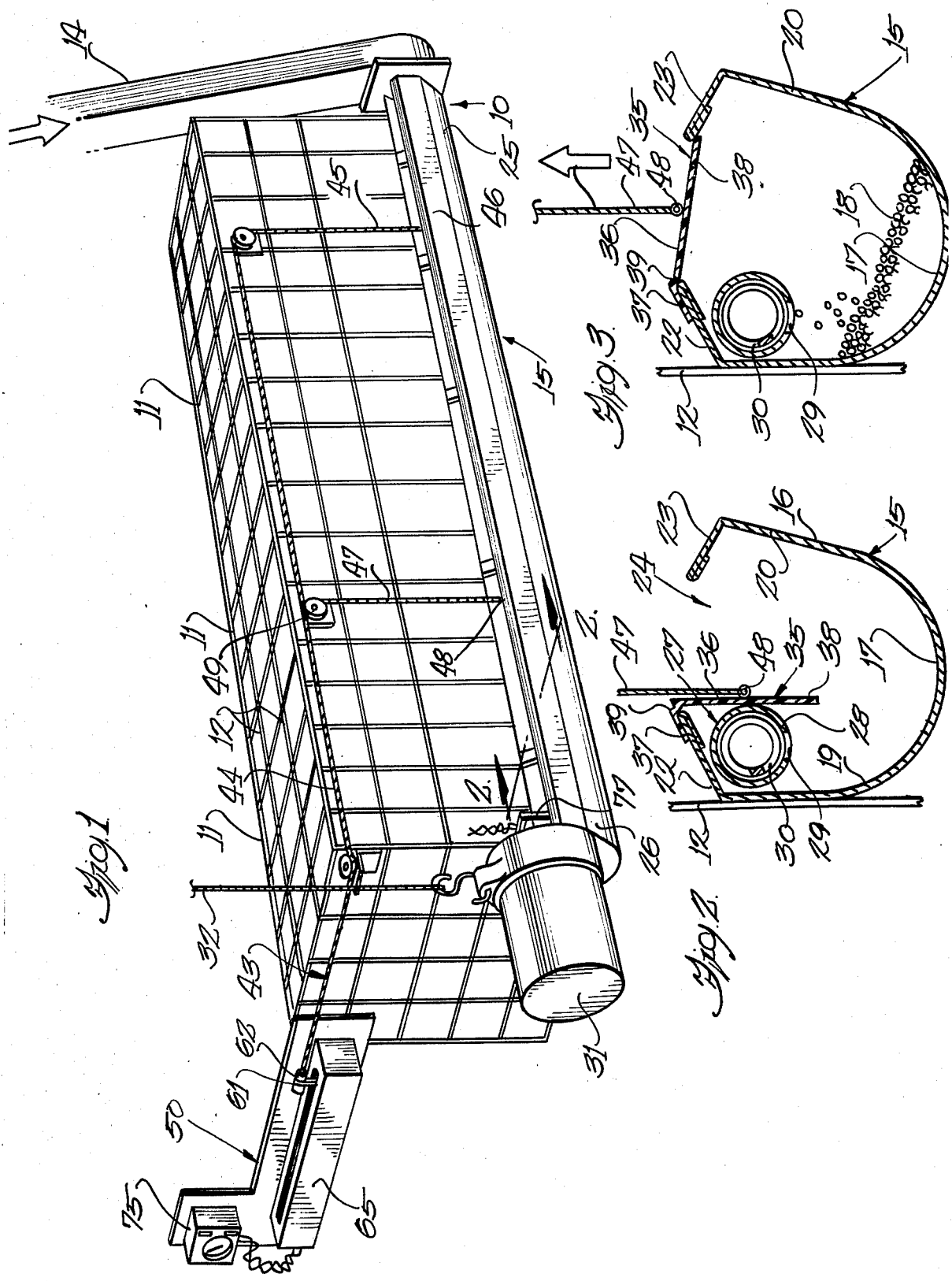

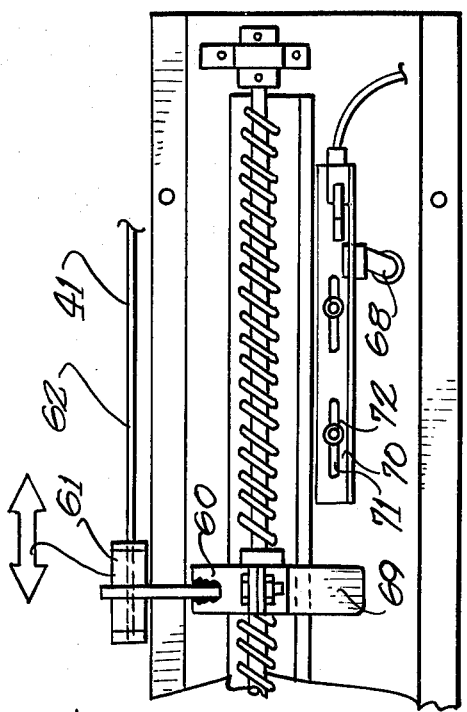
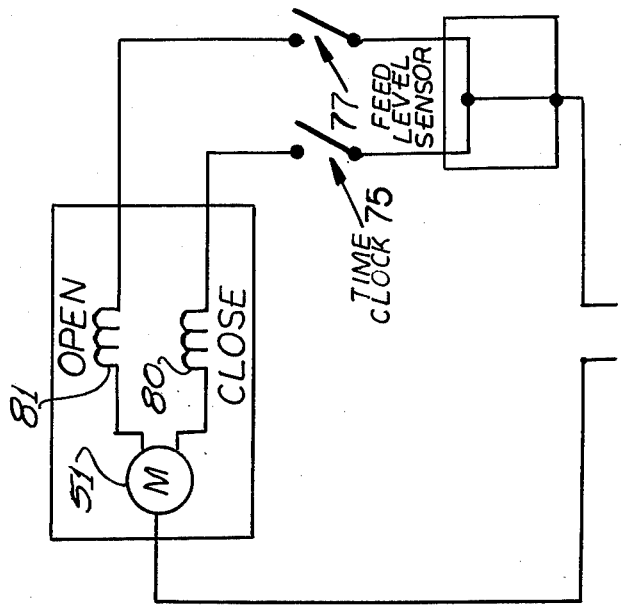
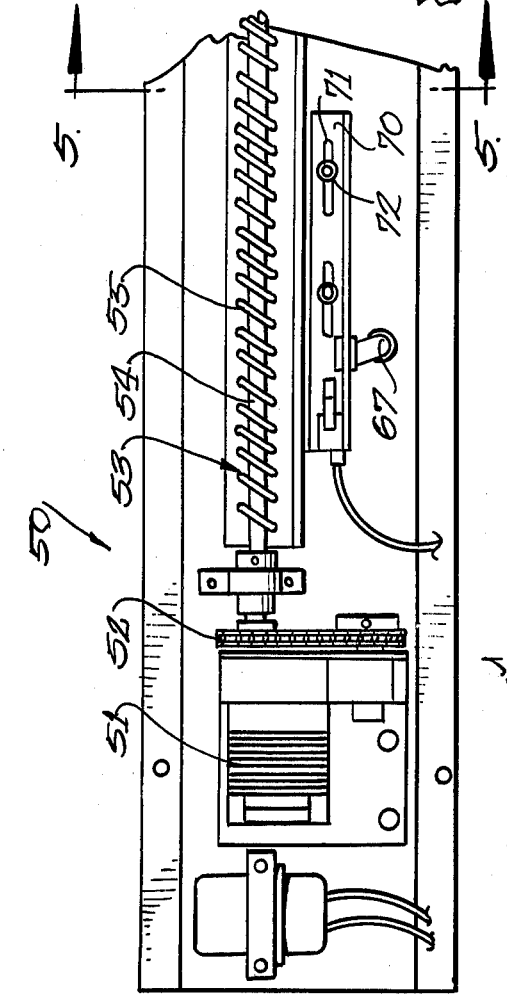
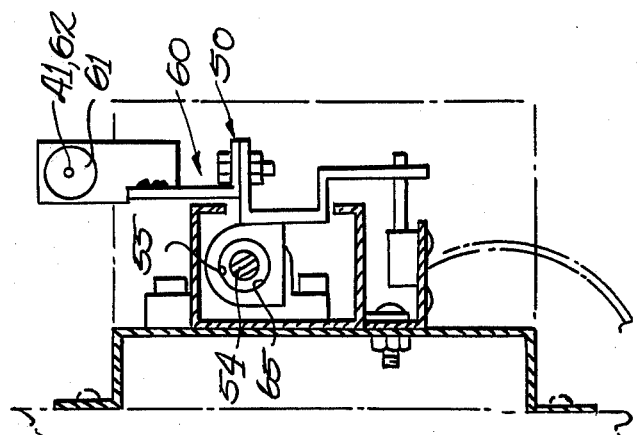

BAFFLE FOR TROUGH FEEDER

BACKGROUND OF THE INVENTION

In modern poultry husbandry operations, control of feed supply is becoming increasingly important. In such operations, several laying or other type of hens are contained within cages, and a number of cages are arranged together to form elongated rows. In front of the cage row, an elongated trough-type feeder is mounted for access by the birds. Carefully blended feed mixes are introduced into the trough feeders at specified times and in specified amounts to encourage high egg production and long flock service life. To carry feed from a remote supply and to deposit feed to equal depths along the entire trough length, feed conveyor devices such as auger conveyors are extensively used.

Uniformly high egg production from every individual member of the flock is promoted by equalized, simultaneous fowl feeding. However, since the trough feed conveyors transport feed from a remote source point to the entire elongated length of the trough, variations in feed initiation may occur. Specifically, when some types of tube and auger conveyors are started, feed first begins to drop from tube outlet holes into the trough at a relatively upstream end. Feed then begins to drop from progressively downstream outlet holes while continuing to drop from the upstream holes. When the supply of feed to the operating conveyor is cut off, feed ceases to drop from the upstream tube holes, while continuing to fall from downstream holes. Thus, feed is deposited in the trough in a wave-like manner, starting at the upstream conveyor end, and ending at the downstream end. If conveyor operation is halted before the conveyor tube has been emptied, relatively more feed may be delivered to the fowl in the upstream cages than is delivered to the downstream birds.

Fowl soon learn to begin eating as soon as feed is delivered in the trough. As a result, upstream fowl enjoy feed allotments delivered over a long period of time, while downstream birds receive a hastily delivered feed allotment. This unequal feeding results in less than maximum egg production or otherwise relatively poor flock performance.

It is therefore the general object of this invention to provide a trough feeder wherein access to feed contained in the feeder trough is provided to all consuming fowl on a simultaneous basis.

More specifically, it is the object of the present invention to prohibit fowl access to a trough feeder during such time as the trough is being filled with feed, and then to simultaneously open the trough for access to the feed by all birds. It is a related object of the invention to prevent birds from eating from a trough feeder during operations which add feed to the trough feeder.

Another object of the invention is to introduce feed to an elongated trough feeder which will be untouched by consuming fowl until the entire trough feeder has been filled to a pre-selected depth.

Yet another object of the invention is to provide access to a trough feeder by consuming fowl during only a pre-set time interval.

A further object is to provide a device which will control fowl feeding at relatively inexpensive cost during a long service life.

Other objects and advantages of the invention will become apparent upon reading the following detailed description and upon reference to the drawings.

Throughout the drawings, like reference numerals refer to like parts.

DETAILED DESCRIPTION OF THE DRAWINGS

FIG. 1 is a perspective view showing typical bird cages, a novel feeder trough disposed before the cages, and the novel feeding shield carried on the trough feeder;

FIG. 2 is a sectional view taken substantially in the plane of line 2—2 in FIG. 1 and showing the trough feeder having the shield member in a relatively lowered or feeding position;

FIG. 3 is a sectional view taken substantially in the plane of line 2—2 in FIG. 1 and showing the trough feeder having the shield member in a relatively raised or blocking position;

FIG. 4 is an elevational view showing the shield positioning or drive mechanism;

FIG. 5 is a sectional view taken substantially in the plane of line 5—5 in FIG. 4 and showing in further detail the shield drive mechanism; and FIG. 6 is a schematic electrical diagram illustrating an electrical circuit used for controlling the feed shield drive mechanism.

DETAILED DESCRIPTION

While the invention will be described in connection with a preferred embodiment and procedure, it will be understood that it is not intended to limit the invention to this embodiment or procedure. On the contrary, it is intended to cover all alternatives, modifications, and equivalents as may be included within the spirit and scope of the invention.

Turning first to FIG. 1, there is shown a feeding system 10 adapted to service several poultry cages 11 such as those found in a modern poultry house. These cages are defined by wire bars 12 and may contain about five or six adult hens each. The poultry feeding system 10 includes a feed input source 14 such as a drop tube and an elongated trough feeder-conveyor 15. As illustrated in FIGS. 1-3, this trough conveyor 15 includes a trough member 16 having a bottom portion 17 adapted to retain a quantity of feed 18 deposited thereon, and two generally upstanding walls 19 and 20. Here the walls 19 and 20 each terminate in overreaching baffles 22 and 23, respectively, which are adapted to discourage the caged fowl from raking or tossing feed from the conveyor. The baffles 22 and 23 also define an open trough top 24, through which poultry can reach the feed 18. It will be understood that other trough cross-sectional shapes, such as V-shaped configurations, can be employed.

In the illustrated device, feed is conveyed or urged along the length of the feeder 15 from a relatively upstream point 25 to a downstream end 26 by a feed conveyor device 27. Here, the feed conveyor 27 includes a hollow tube member 28 provided with feed-dispensing holes 29, within which rotates a feed-moving auger 30. This auger member 30 can be driven by any convenient means such as an electric motor 31 suspended, as by a cable 32, from a poultry house superstructure (not shown). It will be understood that other feed conveyor devices, such as chain conveyors, can be employed.

In accordance with the invention, a shield member 35 is provided on the top of the trough 15 to be moved between a normally opened position such as that shown in FIG. 2 which permits the poultry to reach the feed deposited on the trough bottom 17, and a relatively closed position such as that shown in FIG. 3 which prohibits the poultry from reaching into the trough for any feed present. Here, this shield member 35 comprises an elongated, hinged, plastic member 36 which has a first portion 37 affixed to one trough baffle 22, and a second portion 38 swingable about the first portion 37 from the relatively opened vertical position shown in FIG. 2 to the relatively closed horizontal position across the trough top A shown in FIG. 3. The two trough shield portions 37 and 38 are continuously interconnected along the length of the shield member 35 and the length of the trough 15 by a relatively thin, flexible living hinge membrane 39.

Raising and lowering the shield member 35 from between the positions shown in FIGS. 2 and 3 can be accomplished by a pulley system 43. In the illustrated embodiment, this pulley system 43 includes a master cable 44 attached at one end 45 to a convenient mount 46 on the swinging portion 38 of the shield member 35. Auxiliary cables 47 are attached to other locations 48 on the shield member swinging portion 38. After passing over appropriate pulleys 49, these auxiliary cables 47 are attached to the master cable 44, as illustrated in FIG. 1. Thus, appropriate motion of the master cable 44 serves to raise or lower the swinging portion 38 of the shield member 35 as described above.

In accordance with another aspect of the invention, the master cable 44 and attached shield member 35 are set in motion by a shield drive 50. As illustrated particularly in FIGS. 4–6, a bi-directional motor 51 is coupled by a roller chain drive 52 or other convenient means to drive an elongated screw member 53. This screw member 53 can comprise a cylindrical rod 54 and a smaller wire or bar stock 55 wrapped or wound around the bar 54 in helical manner to form threads, as shown particularly in FIG. 4. A follower member 60 is attached by any convenient means such as a keeper 61 to a head end 62 of the master cable or pulley 44, and is provided with internal guide surface threads 64 (see FIG. 5) to engage and traverse the screw member 53. Thus, rotation of the motor 51 and connected screw member 53 in a designated direction causes translational motion of the follower member 60 and the connected cable 44, thereby moving the shield member 35 into an opened or closed position on the trough 16.

A cover 65 can be mounted over the drive 50 to exclude dirt (see FIG. 1). Limit switches 67 and 68 are located to engage a finger 69 mounted upon the follower 60. As the screw member 53 is rotated to open and close the shield member 35, the follower 60 is translatively moved with corresponding motion into engagement with the appropriate limit switch 67 or 68. When the shield member 35 has reached either a fully opened or fully closed position, the corresponding limit switch 67 or 68 is engaged, the motor circuit is de-energized, and drive motor motion and shield motion are halted.

To permit convenient adjustment of the limit switch locations so as to correspondingly adjust the extreme open or extreme closed position of the shield member 35, the limit switches 67 and 68 can be mounted upon plates 70 or other convenient structure which is provided with elongated mounting slots 71. By loosening associated mounting screws 72 or other fasteners, the carried limit switches 67 or 68 can be moved to correspondingly adjust the limit switch actuation points.

It is a feature of the invention that shield motion can be initiated at a pre-selected time. To that end, a time clock switch 75 can be included in the motor energization circuit to either open or close the trough at a preselected time. Among time clock switches adaptable to this task is one offered by Tork Time Controls, Inc., 100 Grove St., Mount Vernon, N.Y., 10551.

Another feature of the invention is that a feed level sensor switch 77 can be located in the feeder 15 to sense the presence or absence of feed at a pre-selected feed depth level. In response to action by the sensor switch 77, the shield drive circuitry can be energized to move the shield between the open and closed positions.

From the foregoing description and the circuit diagram included in FIG. 6, preferred operation of the invention can be understood. When a pre-selected time is reached, the time clock switch 75 trips, and appropriate coils 80 of the motor 51 are energized to rotate the shield drive 50 in a direction which closes the trough by bringing the shield from the opened position shown in FIG. 2 to the closed position shown in FIG. 3. Simultaneously, conveyor motor 31 is actuated, and the conveyor 27 begins deposit of feed 18 on the trough bottom 17. When the shield member 35 has moved into its closed position as shown in FIG. 3, a limit switch 67 is tripped, and the motor 51 is de-energized, thereby freezing the shield 35 in its closed position. Feed 18 is progressively introduced at the relatively upstream trough end 25 and feed depositing action progresses toward the downstream end 26. When feed has reached a pre-designated level at the downstream end 26, an appropriate depth of feed throughout the trough length is assured, and the presence of feed at this level is sensed by the sensor 77. Operation of the sensor 77 actuates appropriate reversing coils 81 in the motor 51 to drive the screw member 53 in an opposite direction and move the screw follower 60 to the right, as shown in FIGS. 1 and 4. This motion permits the shield member 35 to be dropped into the open position shown in FIG. 2. Removal of the shield 35 from the trough top 24 permits all the poultry in the associated cages 11 to simultaneously reach the deposited feed.

The invention is claimed as follows:

1. In a trough feeder for poultry and the like, the trough including a feed-retaining trough bottom and an open top through which the poultry can reach the feed, and the feeder further including means for depositing feed along the trough bottom, the improvement comprising poultry shield means alternatively movable into a closed position to prohibit the poultry from reaching the feed as feed is being deposited on the trough bottom, and movable into an opened position to permit the poultry to reach the feed after a quantity of feed has been so deposited on the trough bottom, and means for moving the shield between said opened and closed positions in response to the presence or absence of feed at a predesignated location in the trough feeder.

2. A shield according to claim 1 wherein said shield comprises an elongated hinged member having a first portion affixed to the trough and a second portion swingable about the first portion from the opened relatively vertical position into the closed relatively horizontal position across the trough top.

3. A shield according to claim 2 wherein said hinged member is formed in one piece, and wherein said first portion and said second portion are continuously interconnected along the length of the member by a relatively thin, flexible living hinge membrane.

4. A trough feeder for poultry and the like, the trough including an elongated feed-retaining trough bottom and a plurality of upwardly projecting trough sides defining a normally open trough top through which poultry can reach feed, the feeder further including means for delivering feed along the trough bottom, and shield means movable between a closed position across the trough top prohibiting poultry from reaching the feed and an open position away from at least one trough side permitting the poultry to reach the feed through the open trough top and sensor switch means for moving the shield means between the opened and closed positions in response to the presence or absence of feed at a predesignated location in the trough.

5. A trough feeder according to claim 4 including shield drive means for moving the shield means between said opened and said closed positions.

6. A trough feeder according to claim 5 wherein said shield drive means includes a drive screw member and a drive screw follower member.

7. A trough feeder according to claim 5 including time switch means for actuating the shield drive means to move the trough shield means in one direction at pre-selected times, the sensor switch means being connected to the shield drive means to move the shield means in the opposite direction when the presence or absence of feed is sensed by the sensor switch means.

8. A method of feeding poultry from an elongated trough having a normally open top through which the poultry can reach feed, including the steps of placing a shield over the trough top thereby preventing poultry from reaching into the trough, commencing the deposit of feed supply at a pre-set time simultaneously with placement of the shield over the trough top, depositing feed in the trough, sensing the amount of feed in the trough at a pre-determined location, and then simultaneously halting the deposit of feed in the trough and removing the shield from the trough top when a predetermined amount of feed has collected in a predetermined trough location thereby permitting the poultry to simultaneously reach the deposited feed.

* * * * *